United States Patent [19]
Carroll

[11] 3,975,999
[45] Aug. 24, 1976

[54] PORTABLE OUTDOOR GRILL

[76] Inventor: Stephen C. Carroll, 47 Lowergate Court, Owings Mills, Md. 21117

[22] Filed: May 30, 1975

[21] Appl. No.: 582,123

[52] U.S. Cl. ............................ 99/449; 99/450; 126/9 R
[51] Int. Cl.² .......................................... A47J 37/07
[58] Field of Search ............ 99/340, 448, 449, 450; 126/9, 25, 29, 38, 137; 211/106, 119, 134, 178, 181

[56] References Cited
UNITED STATES PATENTS

| | | | |
|---|---|---|---|
| 2,542,137 | 2/1951 | Hanson | 211/178 R X |
| 2,828,866 | 4/1958 | Jarvis | 211/178 R X |
| 3,067,737 | 12/1962 | Brown | 126/9 X |
| 3,461,634 | 8/1969 | Earl | 99/449 X |
| 3,821,926 | 7/1974 | Clark | 99/340 |

*Primary Examiner*—Stanley N. Gilreath
*Assistant Examiner*—Arthur O. Henderson
*Attorney, Agent, or Firm*—Walter G. Finch

[57] ABSTRACT

A portable cooking grill is provided which can be used on open fireplaces and the like. This grill consists of a plurality of parallel spaced metal rods which are held together by a series of inner and outer metal connectors placed along each side of the grill. The parts are maintained in position by crimping the ends of the rods on opposite sides of the connectors. The inner and outer connectors are so designed that the cooking grill can be opened up to be in a flat rigid plane, or rolled up to be positioned in a small container for storage purposes.

4 Claims, 4 Drawing Figures

PORTABLE OUTDOOR GRILL

BACKGROUND OF THE INVENTION

This invention relates generally to outdoor cooking equipment, and more particularly it pertains to a portable cooking grill which can be used in open fireplaces, and which is so constructed as to be rolled up when not in operational use to be positioned in a storage container in a compact position.

SUMMARY OF THE INVENTION

It is an object of this invention, therefore, to provide a portable cooking grill to be used on open fireplaces and the like.

Another object of this invention is to provide a grill of a simple nature that anyone can unroll for use as a cooking surface or roll up for storage. This simplicity eliminates assembly of parts for the grill to be put into use.

Another object of this invention is to provide a dual cooking surface on which utensils may be placed as well as uncooked food, i.e. hot dogs, steaks, which can be placed directly on rod surfaces.

Still another object of this invention is to provide a grill to be manufactured of a size small enough to be used by back-packers.

And another object of this invention is to provide a portable grill which consists of a plurality of parallel spaced metal rods held together by a series of outer and inner metal connectors placed along each side of the grill and secured by crimping the rods on opposite sides of the connector.

Still even another object of this invention is to provide a grill which can be compactly rolled up from a flat operative position and placed into a tubular container for easy storage.

And another object of this invention is to provide a portable grill having unique outer and inner connectors for the rods, which allow the grill to open up to a rigid flat surface while in use, and then to be rolled up into a compact position for storage in a cylindrical type container.

To provide a fireplace grill which is economical to manufacture, and which is efficient and reliable in operational use is another object of this invention.

BRIEF DESCRIPTION OF DRAWINGS

Other objects and attendant advantages of this invention will become more readily apparent and understood from the following detailed specification and accompanying drawings in which.

DETAILED DESCRIPTION

Figure 1:
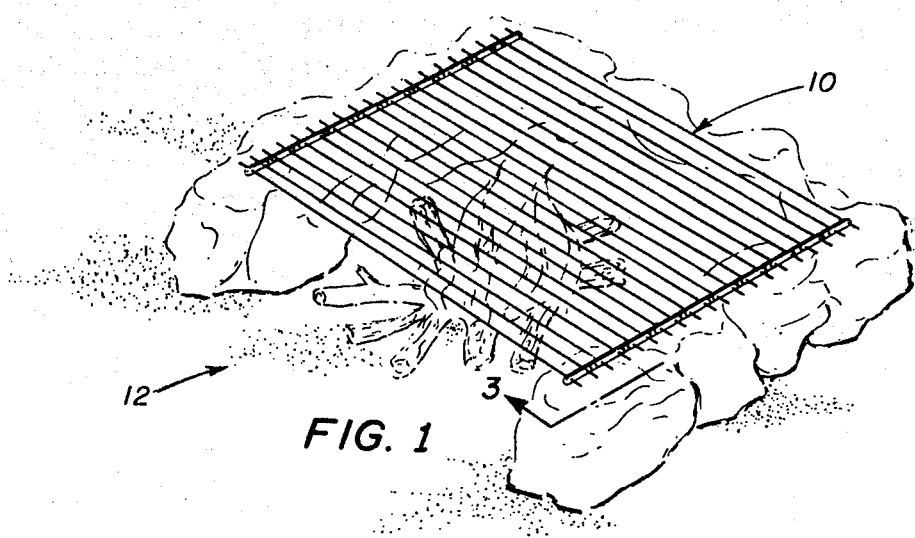
FIG. 1 is a perspective view of a portable outdoor grill incorporating features of my invention in operative position on a fireplace.
Figure 2:
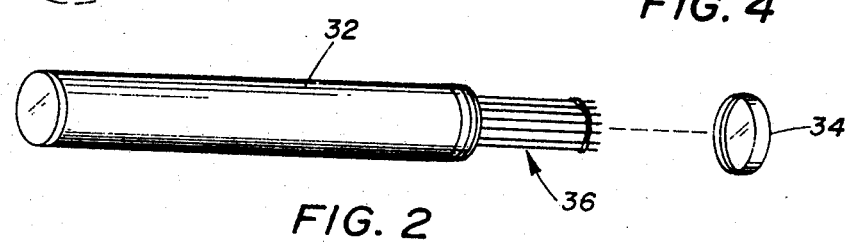
FIG. 2 is a perspective view of the portable outdoor grill of FIG. 1 rolled up and placed in a storage container.

Referring now to FIG. 1 of the drawings, there is shown a portable outside grill 10, incorporating features of my invention, opened up and placed, ready for use, on spaced support members, such as logs or stones, over a fireplace 12. This same grill 10, in a rolled-up configuration 36, is shown in position in a storage container 32 having a top 34, in FIG. 2.

Figure 3:
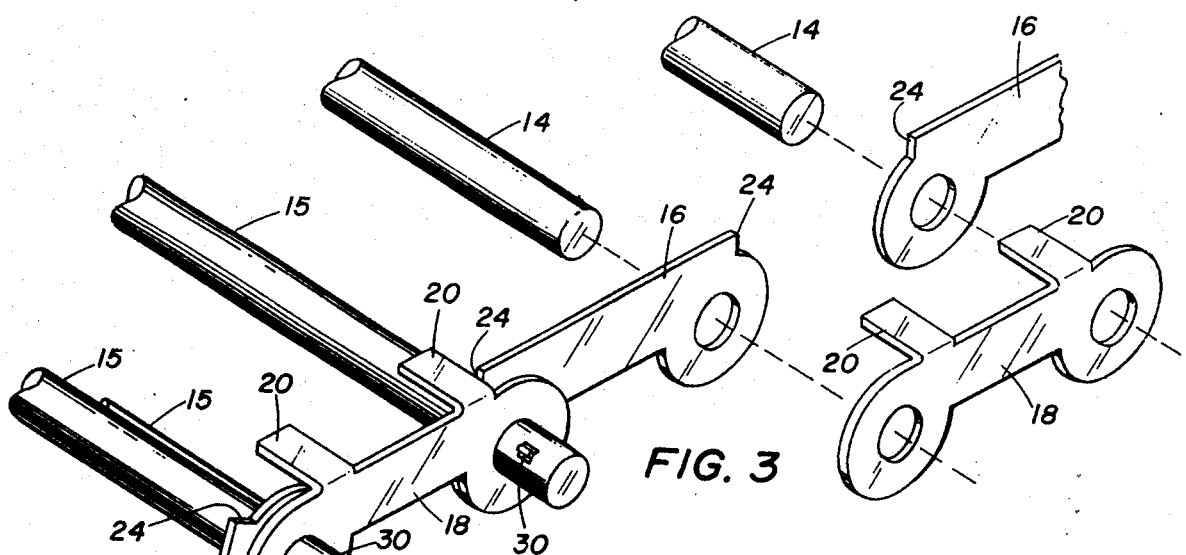
FIG. 3 is a partial isometric view of a portion of the grill taken in the area of line 3 of FIG. 1 showing the assembly of the parts and function of the connectors.
Figure 4:
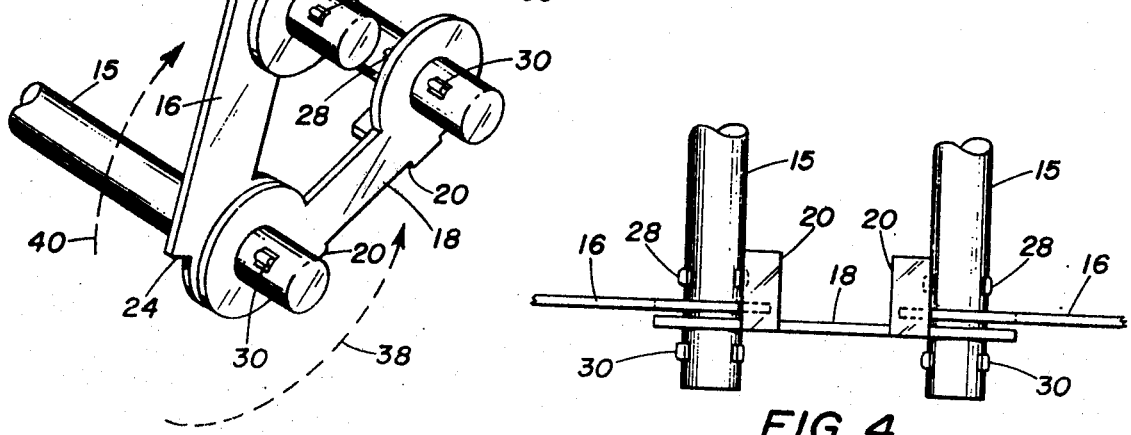
FIG. 4 is a partial top plan view of a portion of the grill.

Referring now to FIGS. 3 and 4 of the drawings, this portable grill 10 is made up of a plurality of three parts, namely a series of parallel spaced metal rods 14, metal inner connectors 16, and metal outer connectors 18, several of which are shown unassembled and assembled in FIG. 3.

Each metal inner connector 16 is provided with a circular shaped enlargement and a stop at opposite ends thereof, with an aperture in each enlargement for receiving the free end of a rod 14, before assembly and crimping. Each metal inner connector 16 connects together a pair of adjacent rods 14 in the unassembled portion of FIG. 3 and connects together a pair of adjacent rods 15 in the assembled portion of FIG. 3.

Each outer connector 18 is also formed with a circular shaped enlargement at each end, with each enlargement having an aperture therein for receiving its respective end of the rod 14. In addition, each outer connector 18 is provided with spaced tabs 20, bent at right angles to the connector 18, as best shown in FIG. 3. An outer connector 18 is used to connect together two adjacent pairs of rods 14 as shown in FIG. 3.

The rods 14, inner connectors 16, and outer connectors 18, are assembled together as shown in FIG. 3, and the parts are held together by forming crimps 28 and 30 on the opposite sides of the respective inner and outer connectors 16 and 18 of each rod 14 (with the rod 14 being renumbered 15, when assembled).

When the rods 14 (unassembled) are assembled to form the grill 10, as shown in FIGS. 1 and 3, with the assembled rods being renumbered as 15, the tabs 20 on the outer connectors 18 ride on the circular enlargements of the inner connectors 16 and contact the adjacent stops 24 on the inner connectors 16. This action holds the entire portable grill 10 rigid and flat as best shown in FIG. 1.

When the grill 10 (rolled position 36) is taken out of its container 32 and opened up in the direction of the arrow 40 of FIG. 3, it can be arranged on the fireplace 12 as shown in FIG. 1. On the other hand, when the portable outdoor grill 10 is moved in the direction of the arrow 38 of FIG. 3, it can be formed into substantially a cylindrical configuration, such as shown by reference numeral 36, and placed in container 32 and the top 34 replaced thereon for compact storage.

Obviously many modifications and variations of the present invention are possible in light of the above teachings. It is, therefore, to be understood that within the scope of the appended claims the invention may be practiced otherwise than as specifically described.

What is claimed is:

1. A portable outdoor grill, comprising, a plurality of pairs of parallel spaced metal rods, inner connector means for connecting together the ends of succeeding pairs of said metal rods, each inner connector means being provided with a stop at opposite ends thereof, outer connector means for connecting together the ends of two succeeding pairs of said rods, each outer connector means being provided with an element at opposite ends thereof for engagement with its respective stop to hold said rods in a flat, rigid position when said grill is in operational use, the elements and stops being releasable to allow said grill to be rolled up into substantially a cylindrical configuration for compact storage when not in operational use.

2. A portable outdoor grill as recited in claim 1, wherein each stop on each inner connector means is a shoulder formed substantially transversely to said rods, and each element on the outer connector means is a tab positioned substantially parallel to said rods, with the respective stop and tab for each rod being arranged to come into contact with each other when the grill is moved in one direction for operational use and to move apart when the grill is moved in the opposite direction for non-operational use.

3. A portable outdoor grill as recited in claim 1, and means for holding said inner and outer connectors in an assembled position on said rods.

4. A portable outdoor grill as recited in claim 3, wherein said means for holding said inner and outer connectors in an assembled position in said rods consists of crimps formed in each rod on the opposite sides of its respective inner and outer connectors.

* * * * *